(12) United States Patent
Grosfeld et al.

(10) Patent No.: US 6,730,432 B1
(45) Date of Patent: May 4, 2004

(54) SECURE BATTERY LATCH

(75) Inventors: Henry Grosfeld, Great Neck, NY (US); Frank Gong, Syosset, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/154,153

(22) Filed: May 23, 2002

(51) Int. Cl.⁷ .............................................. H01M 2/10
(52) U.S. Cl. ..................... 429/97; 429/96; 429/100; 429/159; 429/186; 206/703
(58) Field of Search ............... 429/96, 97, 98, 429/99, 100, 159, 186, 163, 176; 206/703; D13/103

(56) References Cited

U.S. PATENT DOCUMENTS

| | | | | |
|---|---|---|---|---|
| 5,251,329 A | * | 10/1993 | Takagi et al. | 455/572 |
| 5,586,184 A | | 12/1996 | Piper | 379/433 |
| 5,621,618 A | * | 4/1997 | Komiyama | 361/732 |
| 5,693,431 A | | 12/1997 | Nierescher et al. | 429/97 |
| 5,741,305 A | * | 4/1998 | Vincent et al. | 607/5 |
| 5,830,598 A | * | 11/1998 | Patterson | 429/121 |
| 6,225,777 B1 | | 5/2001 | Garcia et al. | 320/112 |
| 6,261,715 B1 | | 7/2001 | Nakamura et al. | 429/100 |
| 6,274,266 B1 | | 8/2001 | Wang | 429/163 |

FOREIGN PATENT DOCUMENTS

JP  07142045 A  *  6/1995  ............ H01M/2/10

* cited by examiner

*Primary Examiner*—Gregg Cantelmo
(74) *Attorney, Agent, or Firm*—Amin & Turocy, LLP

(57) ABSTRACT

Systems and methods for securing a battery within a battery compartment are provided. The battery is coupled to at least one latch such that the latch is slidably engageable with a latch receiving undercut in the battery compartment. The latch slides into engagement with the undercut after electrical contacts on the battery have connected with electrical contacts in the battery compartment. The secure latch mechanism facilitates maintaining a constant force between the electrical contacts while mitigating contact chatter and stress on a battery cover.

9 Claims, 12 Drawing Sheets

SECURE BATTERY LATCH

TECHNICAL FIELD

The present invention generally relates to portable electronic devices. In particular, the present invention relates to systems and methods for securing a battery to a portable electronic device.

BACKGROUND OF THE INVENTION

Small, portable batteries provide electric power to portable electronic and electrical devices such as radios, lap top computers, car alarms, garage door openers, smoke alarms, telephones, pagers, television and video controllers, electronic game controllers, and other devices. Batteries are typically contained within a compartment or chamber covered by a moveable door or panel. Such doors prevent batteries from being displaced from electrical contacts and prevent dirt from entering the battery compartment.

For example, a conventional mobile terminal includes a battery compartment and a cover to house one or more standard batteries. The cover has a latch hook engageable with a latch slot located in the battery compartment. However, such a fastening structure could easily result in break away of the cover and thus, the battery, from the compartment, particularly under external force, such as an accidental dropping of the mobile terminal.

Another disadvantage with the conventional battery compartments is battery contact chatter. Contact chatter can be caused by external vibration or shock on a closed contact. High speed processors require zero contact chatter. If the chatter occurs at a critical time, the results can often be devastating. For example, chatter can cause a system to lock up or reboot, which in turn, causes data loss. As an additional example, if a memory write takes place during a power interruption, memory corruption can occur, and checksums may be incorrectly computed or not be written at all.

Accordingly, there is a need for a secure battery system in which electrical contacts between the battery and the device are reliable and continuous under various conditions, including an accidental drop or vibration of the device.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methods for securing a battery within a battery compartment within a portable electronic device are provided. The battery is coupled to at least one latch such that the latch is slidably engageable with a latch receiving undercut in the battery compartment. The latch slides into engagement with the undercut after electrical contacts on the battery have connected with electrical contacts in the battery compartment. Additionally, battery contacts are rigidly secured (e.g., welded) to a battery well rather than to a printed circuit board or top housing. Thus, relative motion of portable electronic device during impact does not separate spring contacts in the device from the battery contacts. The secure latch mechanism coupled with the rigid structure of the battery contacts facilitates maintaining a constant force between the electrical contacts while mitigating contact chatter and stress on a battery cover.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
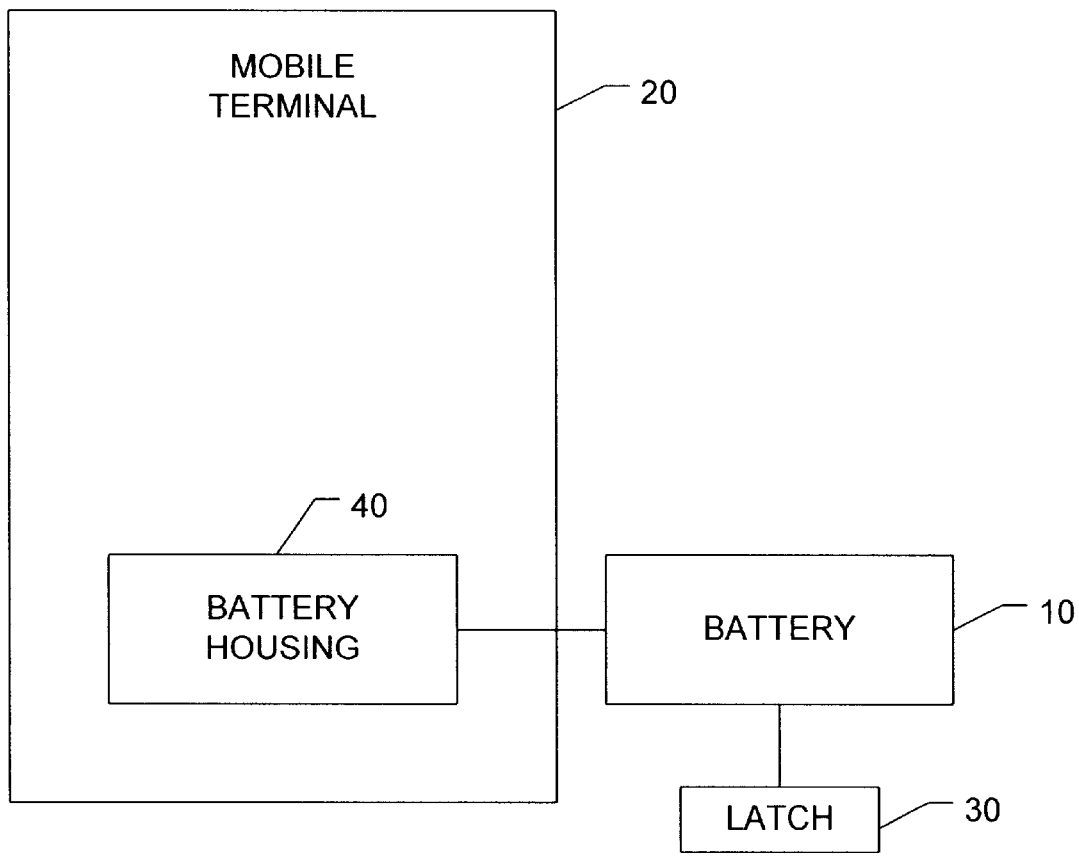
FIG. 1 illustrates a schematic block diagram of a battery for a portable electronic device in accordance with an aspect of the present invention.

The present invention relates to systems and methods for securing a battery to a portable electronic device. The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

Referring initially to FIG. 1, a battery 10 is provided for a portable electronic device 20 in accordance with an aspect of the present invention. The portable electronic device 20 in this example is a hand-held mobile terminal used in a wireless communication network. The battery 10 is coupled to at least one latch 30, which is slidably attached to the battery 10 or a battery housing. The latch 30 is employed to secure the battery 10 to the hand-held mobile terminal 20. In particular, the battery 10 can be secured in a battery compartment 40 located in, or on, the hand-held mobile terminal 20. It is to be appreciated that the battery 300 may be of any type (e.g., alkaline, Nickel-Cadmium, Nickel-Metal-Hydride) depending upon the application at hand.

Figure 2:
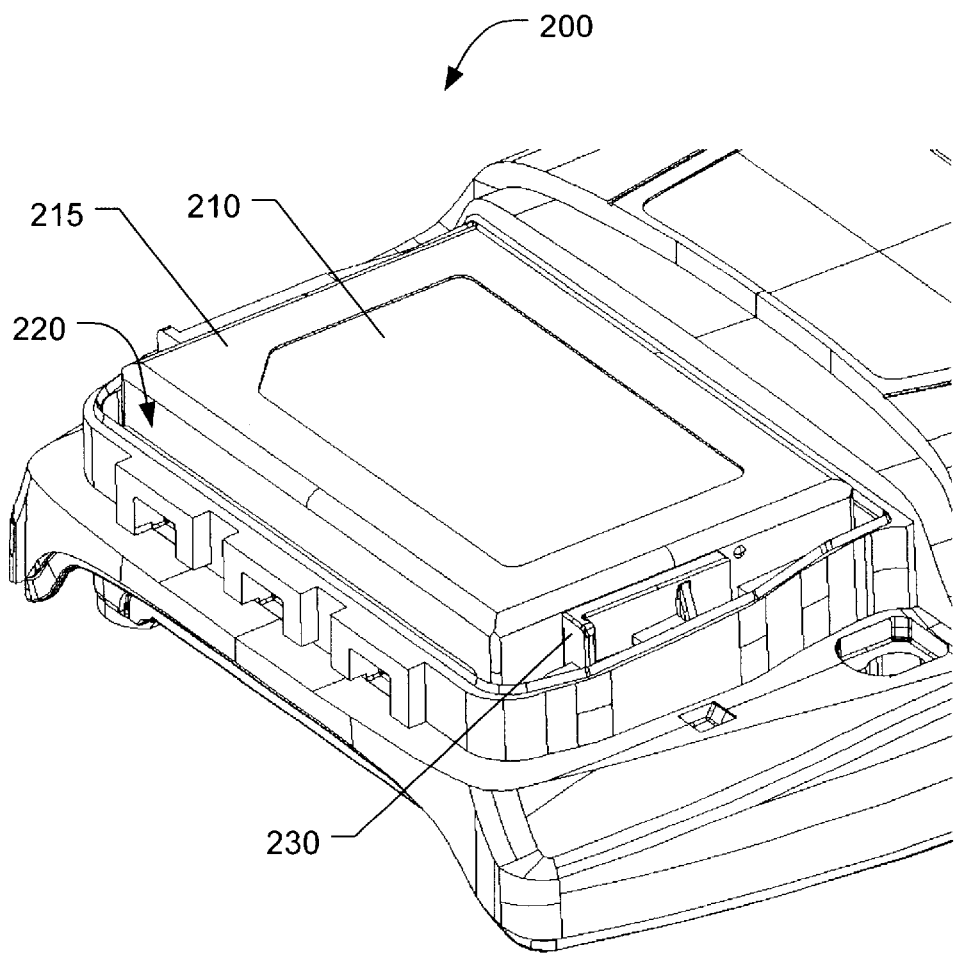
FIG. 2 illustrates a perspective view of a battery and battery compartment for a portable electronic device in accordance with an aspect of the present invention.

FIG. 2 illustrates an example of a hand-held mobile terminal 200 having a battery housing 215 secured to a battery compartment 220. The housing 215 includes a battery 210 of any type suitable for the mobile terminal 200. The battery compartment 220 is depicted as being located in a bottom portion of the mobile terminal 200. However, it is to be appreciated that the compartment can be located in any suitable portion of the terminal. A latch mechanism 230 is slidably attached to the battery housing 215 and is employed to mechanically secure the battery 210 and battery housing 215 to the mobile terminal 200. The latch mechanism 230 engages with undercuts (not shown) in the battery compartment 220, which facilitates a consistent contact force between electrical contacts of the battery 210 and electrical contacts of the mobile terminal 200. Moreover, the latch mechanism 230 provides enough contact force between the battery 210 and the mobile terminal 200 such that contact chatter and bounce occasioned by vibration or bumping of the mobile terminal 200 is mitigated. Accordingly, the battery 210 and the terminal 200 are less sensitive to external forces (e.g., vibration, drop). Additionally, the battery contacts are rigidly secured (e.g., welded) to a battery well rather than to a printed circuit board or top housing. Thus, relative motion of the mobile terminal 200 during impact does not separate spring contacts in the mobile terminal 200 from the battery contacts.

Figure 3:
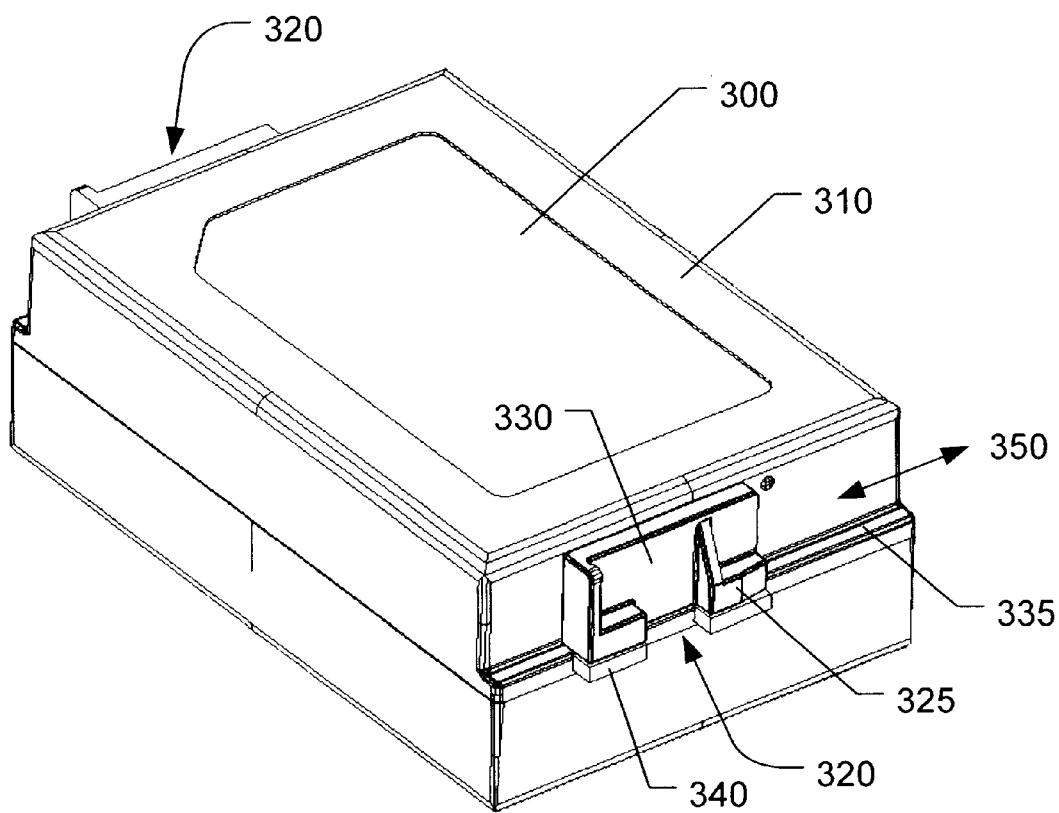
FIG. 3 illustrates a perspective view of a battery for a portable electronic device in accordance with an aspect of the present invention.

FIG. 3 illustrates a battery 300 and battery housing 310 in accordance with an aspect of the present invention. Two latch mechanisms 320 are coupled to the battery housing 310 to facilitate a secure engagement of the battery 300 with a mobile terminal. The latch mechanism 320 includes two L-shaped latches 325 coupled to a backing 330. The backing facilitates a sliding motion of the latches 325 along a stepped surface 335 of the battery housing 310. The latch mechanism 320 also includes two supports 340 employed to facilitate a slidable engagement of the latches 325 with the stepped surface 335 of the housing 310. Thus, the latch mechanism 320 is capable of sliding along a side of the housing 310 in a direction as indicated by arrow 350. The latch mechanism 320 can be made of plastic or any other suitable material and can be formed as one segment or as an assembly of two or more segments. In this example, four latches 325 are coupled to the battery housing 310 and are located such that two latches 325 are placed on two opposing sides of the housing 310. However, it is to be appreciated that any number of latches can be coupled to a battery or battery housing and will be contemplated as falling within the scope of the invention.

The L-shaped configuration of the latches 325 facilitate a slidable engagement with undercuts located in a battery compartment (e.g., 420). The battery and housing assembly 300, 310 is placed in the compartment such that the latches 325 are fitted into an opening of the undercuts. The latch mechanism 320 is then slid in a direction indicated by arrow 350 to secure the battery 300 and housing 310 in place. Thus the battery 300 is easily installable in and removable from the battery compartment of a mobile terminal. The battery 300 provides power to the hand-held mobile terminal through electrical contacts (not shown) designed to correspond to electrical contacts (not shown) located in the mobile terminal. The contacts can be made of a highly conductive metal that is resistant to corrosion, such as, for example, Gold plate and/or Nickel plate over Beryllium Copper. To further secure the battery and housing assembly 300, 310 to the battery compartment, a locking mechanism located in a battery cover, which will be described in further detail below, is employed to mitigate movement of the latch. Thus, when the battery cover is in place, the latching mechanism is held in a locked position.

Figure 4:
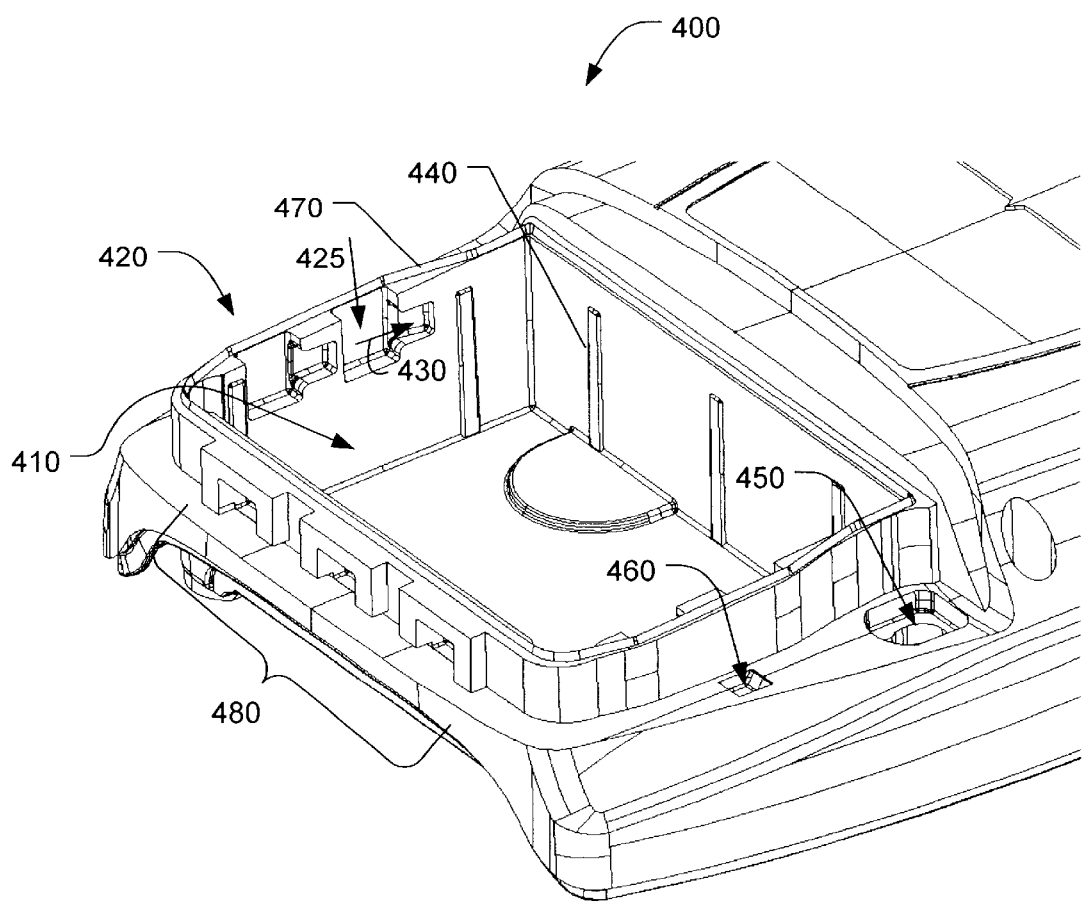
FIG. 4 illustrates a perspective view of a battery compartment for a portable electronic device in accordance with an aspect of the present invention.

In FIG. 4, a bottom portion of a hand-held mobile terminal 400 having a battery compartment 410 therein is shown in accordance with an aspect of the present invention. Four latch receiving undercuts 420 are located in the compartment 410 to correspond with latches (e.g., 325) coupled to a battery. The undercuts 420 are configured such that the latches can be slidably engaged with the undercuts 420. The latches are fitted into the undercuts 420 in a direction indicated by arrow 425. Then, the latches are slid into engagement in a direction indicated by arrow 430. Thus, upon engagement of the latches, the battery is secured within the battery compartment 410 without the need for a battery cover or spring mechanism to hold the battery in place. In this example, four latch receiving undercuts 420 are depicted such that two undercuts 420 are located on two opposing sides of the compartment 410. However, it is to be appreciated that any number of undercuts may be located within the compartment 410. The battery compartment 410 also includes electrical contacts 440 which correspond to electrical contacts located on a battery. Similar to the described in FIG. 3, the contacts 440 in the battery compartment 410 can be made of a highly conductive metal that is resistant to corrosion, such as, for example, Gold plate and/or Nickel plate over Beryllium Copper. Employing the latches and latch receiving undercuts to secure the battery in place, facilitates a constant contact force between the electrical contacts of the battery and the electrical contacts of a mobile terminal thus improving operation of the mobile terminal.

A battery cover (not shown) includes two locking protrusions such that two opposing sides of the cover each have one protrusion to secure the cover to the compartment 410. Thus, two apertures 450 are provided in the mobile terminal 400, one on each side of the battery compartment 410, to receive the locking protrusions. Moreover, two smaller apertures 460 are also provided in the terminal 400 to correspond with alignment protrusions located on the battery cover. Thus, the smaller apertures 460 facilitate alignment of the cover with the compartment 410. Three additional apertures 480 are also provided in the mobile terminal 400 to facilitate securing the battery cover to the battery compartment. The apertures 480 correspond and engage with protrusions in the battery cover for sufficient cover retention. It is to be appreciated that any number of apertures and corresponding protrusions for aligning and/or securing the battery cover to the battery compartment may be employed. It is to be further appreciated that any configuration or cover locking system used to secure the battery cover to the mobile terminal may be employed.

The battery compartment 410 also includes a gasket 470 to provide a seal between the compartment 410 and the battery cover. The gasket 470 is provided around a perimeter of the opening of the battery compartment 410 and is operable to keep out contamination, which might otherwise enter the compartment 410 from outside and thereby affect performance of the mobile terminal 400. The gasket 470 can be of rubber, foam, or any other elastomer, operable to sufficiently seal the battery compartment 410 of the hand-held mobile terminal 400. This seal mitigates dust and other contaminates from entering the clean environment of the battery compartment 410.

Figure 5:
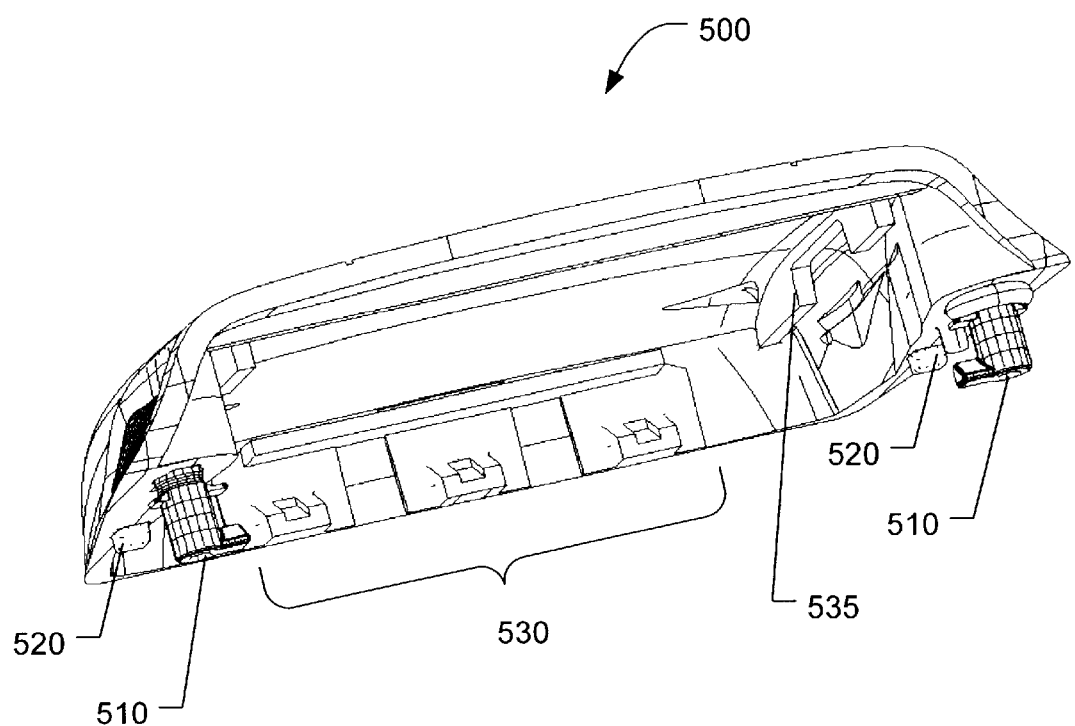
FIG. 5 illustrates a perspective view of a cover for a battery compartment for a portable electronic device in accordance with an aspect of the present invention.

FIG. 5 illustrates an example of a cover 500 for a battery compartment. Two locking protrusions 510 are located at opposing sides of the cover 500 to facilitate attachment of the cover 500 to a mobile terminal. The locking protrusions 510 are configured such that the protrusions 510 are pivotably engageable with apertures located in the mobile terminal (e.g., 450). However, it will be recognized that any suitable orientation or shape may be used. Two alignment protrusions 520 are also provided on the battery cover 500 to facilitate alignment of the cover 500 to a battery compartment. Further, the cover includes three additional protrusions 530, which are located at an inside edge of the cover 500 and are employed to keep the battery cover in place.

An additional locking mechanism 535 is provided on an inner surface of the battery cover 500 for controlling a latch mechanism. The locking mechanism 535 is configured such that when the latch is in a locked position, the locking mechanism will hold the latch in place. Thus, the locking mechanism 535 mitigates movement of the latch into an unlocked position when the battery cover 500 is in place.

Figure 6:
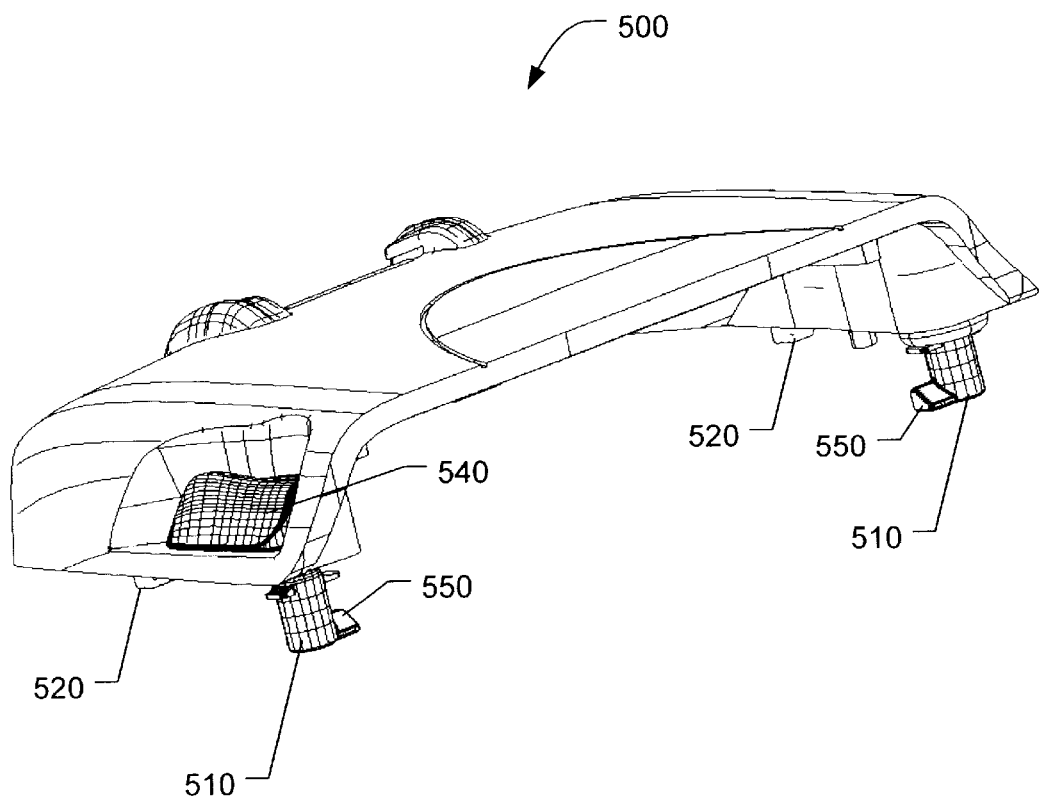
FIG. 6 illustrates a perspective view of a cover for a battery compartment for a portable electronic device in accordance with an aspect of the present invention.
Figure 7:
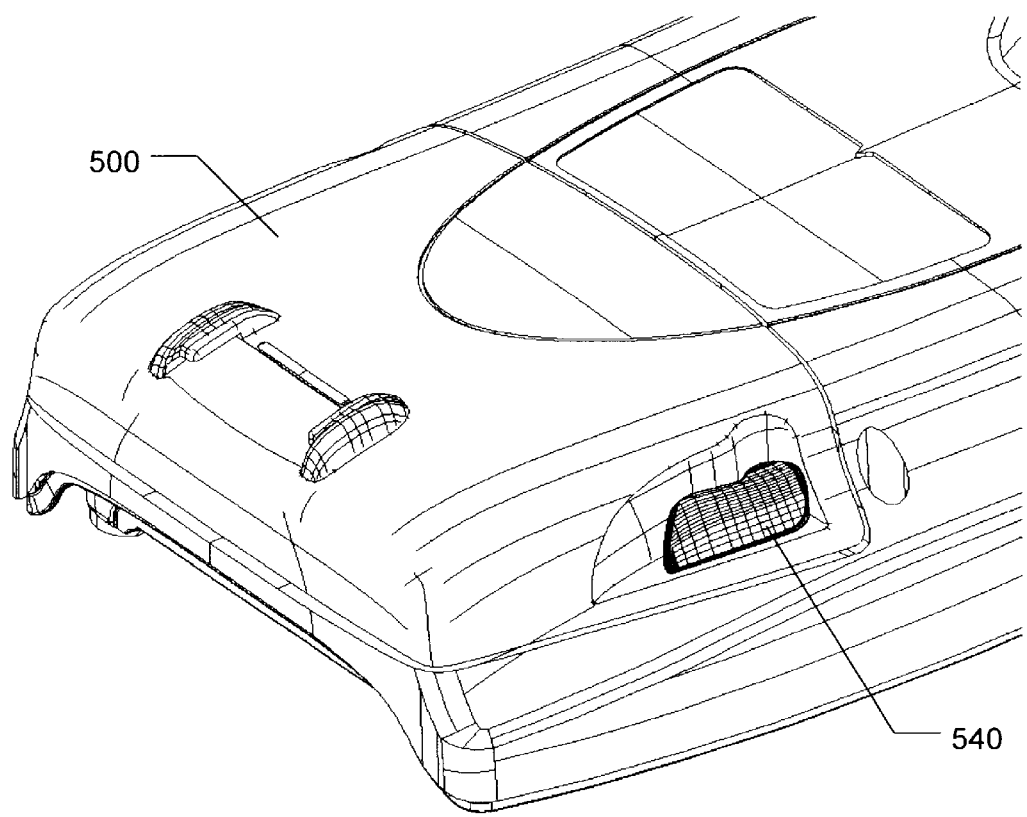
FIG. 7 illustrates a perspective view of a cover coupled with a batter compartment for a portable electronic device in accordance with an aspect of the present invention.

Turning now to FIG. 6, another view of the cover 500 is depicted. The cover 500 includes locking tabs 540 to secure the cover 500 to a mobile terminal, as illustrated in FIG. 7. The protrusions 510 are coupled to the locking tabs 540 such that tabs 540 can pivotally rotate the protrusions 510 to "lock" and "unlock" the cover 500 from a battery compartment, thus mitigating an unintentional opening of the cover 500. The protrusions 510 include a lip 550 at a bottom portion of the protrusion 510 to engage with a corresponding aperture located in the mobile terminal. Two locking tab and protrusion assemblies are employed to balance the alignment of the cover better. However, it is possible to implement the invention with only one locking assembly. To remove the battery cover 24, the locking tabs are depressed, thus pivoting the protrusions 510 in a manner operable to disengage with the aperture.

Figure 8:
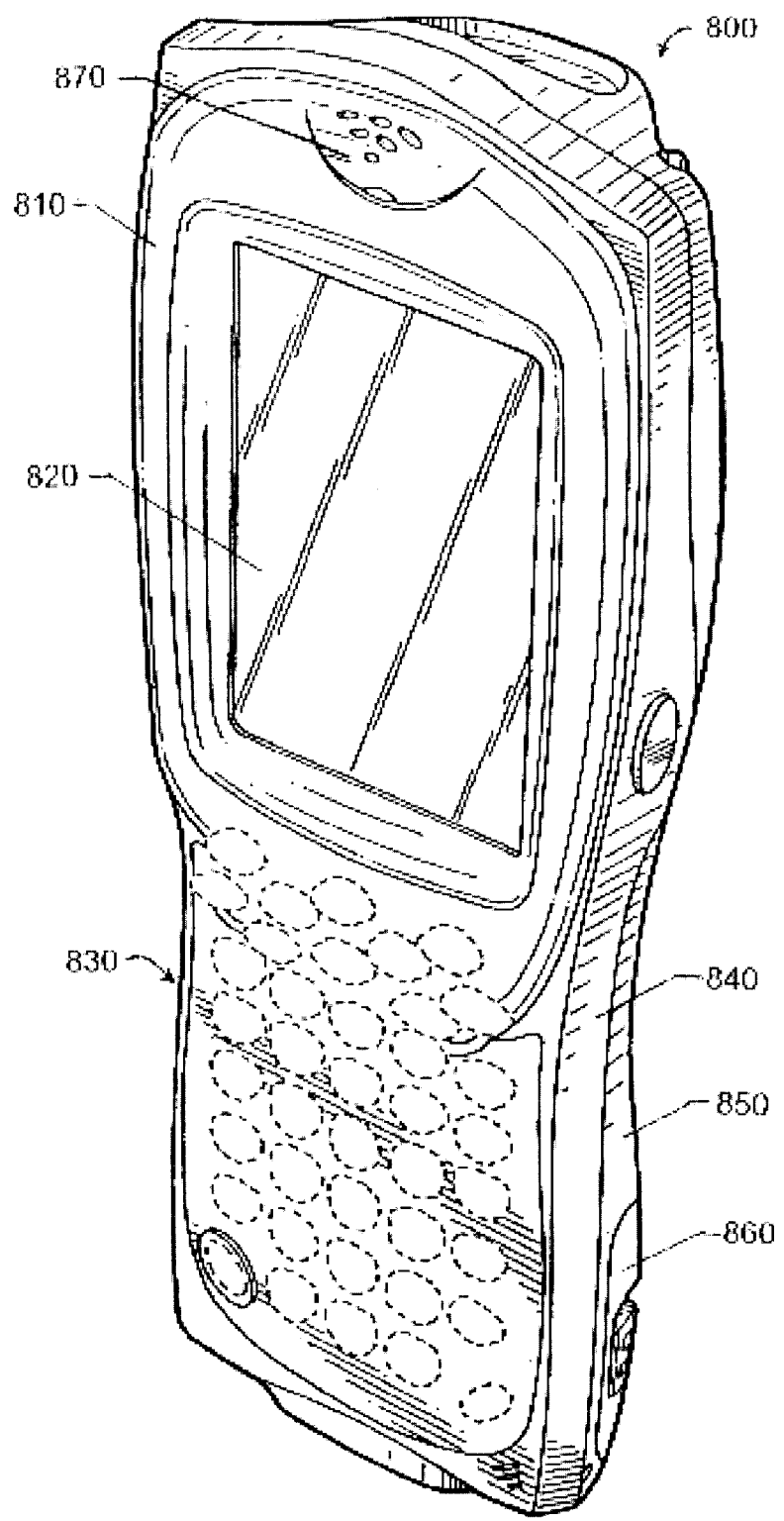
FIG. 8 illustrates a perspective front view of a portable electronic device in accordance with an aspect of the present invention.
Figure 9:
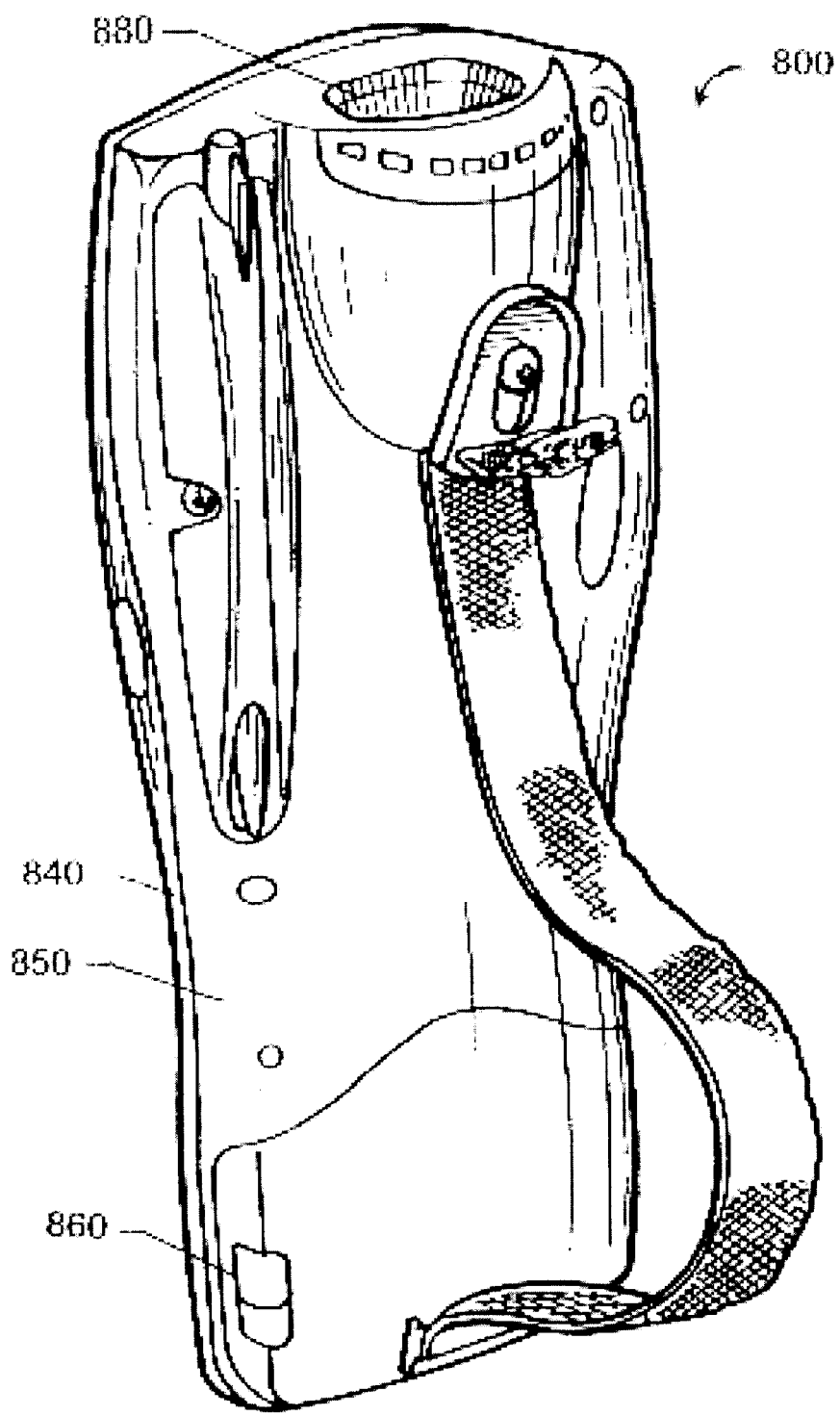
FIG. 9 illustrates a perspective back view of a portable electronic device in accordance with an aspect of the present invention.

Turning now to FIGS. 8 and 9, pictorial representations of front and back views, respectively, of a hand-held mobile terminal 800 are shown. The user may input and/or process data via a keypad, bar code scanner, etc. independent of the hand-held mobile terminal 800 being connected to a LAN, for example. When the mobile terminal 800 does not include a radio to provide for real time communications of data to a LAN, the data is stored in memory within the hand-held mobile terminal 800. In such circumstances, when the mobile terminal 800 is eventually connected to a LAN, the data can be transmitted to a host computer (not shown). It will be appreciated that the portable device could also be any other device that is portable in nature and having electronic circuitry therein in accordance with the present invention. For example, the portable device could be a laptop computer or notebook computer, a PDA, or even a cellular telephone or pager.

In FIG. 8, the mobile terminal 800 includes a compartment 810, a touch screen 820 and a set of user interface keys 830. Both the touch screen 820 and the user interface keys 830 can be used for allowing a user to input information and/or operational commands. The touch screen 820 is further used to display information to the user and may employ capacitive, resistive touch, infrared, surface acoustic wave, or grounded acoustic wave technology. The user interface keys 830 may include a full alphanumeric keypad, function keys, enter keys, etc. The described components 820 and 830 are located in the compartment 810 that is an elongated enclosure of a size and includes such contours as to conveniently fit into the open palm of the user. The compartment 810 may be comprised of a number of shell portions such as for example front and rear shells 840 and 850 (FIGS. 8 and 9) as well as a battery compartment cover 860 (FIG. 9). A speaker 870 is also included to transmit and/or receive audio information to and from the user.

Turning to FIG. 9, the mobile terminal 800 further includes a window 880 in which a bar code reader is able to read a bar code label, or the like, presented to the mobile terminal 800. The mobile terminal 800 can include a LED (not shown) that is illuminated to reflect whether the bar code has been properly or improperly read. Alternatively, or additionally, a sound may be emitted from the speaker 870 to alert the user that the bar code has been successfully imaged and decoded.

Figure 10:
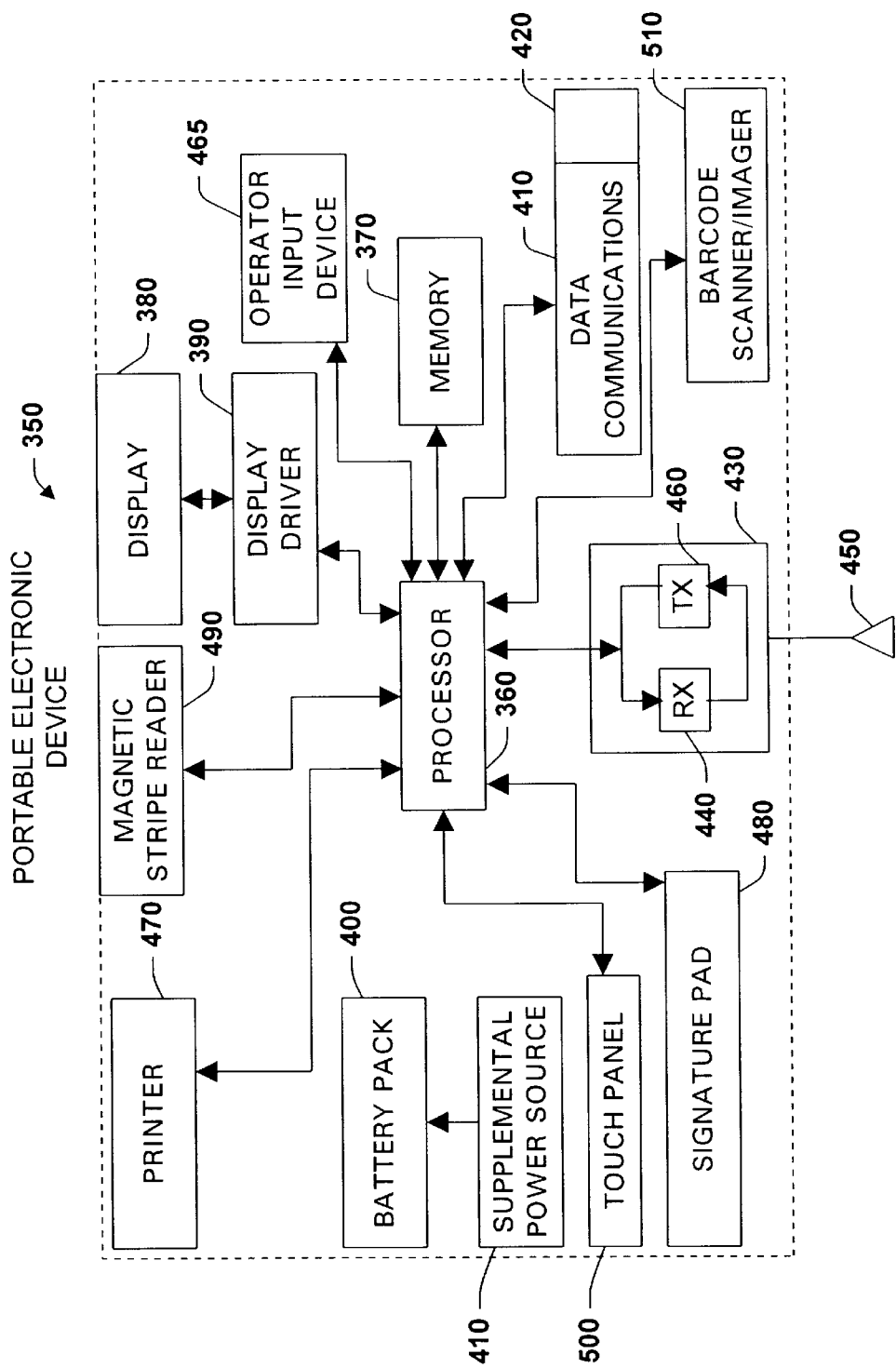
FIG. 10 illustrates a schematic block diagram of a general operation of a portable electronic device in accordance with an aspect of the present invention.

Turning now to FIG. 10, a schematic representation according to one aspect of the present invention is shown in which a processor 1005 is responsible for controlling the general operation of a hand-held mobile terminal 1000. The processor 1005 is programmed to control and operate the various components within the mobile terminal 1000 in order to carry out the various functions described herein. The processor or CPU 1005 can be any of a plurality of suitable processors. The manner in which the processor 1005 can be programmed to carry out the functions relating to the present invention will be readily apparent to those having ordinary skill in the art based on the description provided herein.

A memory 1010 tied to the processor 1005 is also included in the hand-held mobile terminal 1000 and serves to store program code executed by the processor 1005 for carrying out operating functions of the hand-held mobile terminal 1000 as described herein. The memory 1010 also serves as a storage medium for temporarily storing information such as receipt transaction information and the like. The memory 1010 is adapted to store a complete set of the information to be displayed. According to one aspect, the memory 1010 has sufficient capacity to store multiple sets of information, and the processor 1005 could include a program for alternating or cycling between various sets of display information.

A display 1015 is coupled to the processor 1005 via a display driver system 1020. The display 1015 may be a liquid crystal display (LCD) or the like. In this example, the display 1015 is a ¼ VGA display with 16 levels of gray scale. The display 1015 functions to display data or other information relating to ordinary operation of the hand-held mobile terminal 1000. For example, the display 1015 may display a set of customer information, which is displayed to the operator and may be transmitted over a system backbone (not shown). Additionally, the display 1015 may display a variety of functions that control the execution of the mobile terminal 1000. The display 1015 is capable of displaying both alphanumeric and graphical characters. Power is provided to the processor 1005 and other components forming the hand-held mobile terminal 1000 by a battery 1025. In the event that the battery 1025 fails or becomes disconnected from the mobile terminal 1000, a supplemental power source 1030 provides power to the processor 1005. The mobile terminal 1000 may enter a minimum current draw of sleep mode upon detection of a battery failure.

The mobile terminal 1000 includes a communication subsystem 1035 that includes a data communication port 1040, which is employed to interface the processor 1005 with the main computer. The mobile terminal 1000 also optionally includes an RF section 1045 connected to the processor 1005. The RF section 1045 includes an RF receiver 1050, which receives RF transmissions from the main computer for example via an antenna 1055 and demodulates the signal to obtain digital information modulated therein. The RF section 1045 also includes an RF transmitter 1060 for transmitting information to the main computer, for example, in response to an operator input at a operator input device 1065 (e.g., keypad) or the completion of a transaction. Peripheral devices, such as a printer 1070, signature pad 1075, magnetic stripe reader 1080, and a barcode scanner/imager 1085 can also be coupled to the mobile terminal 1000 through the processor 1005.

Figure 11:
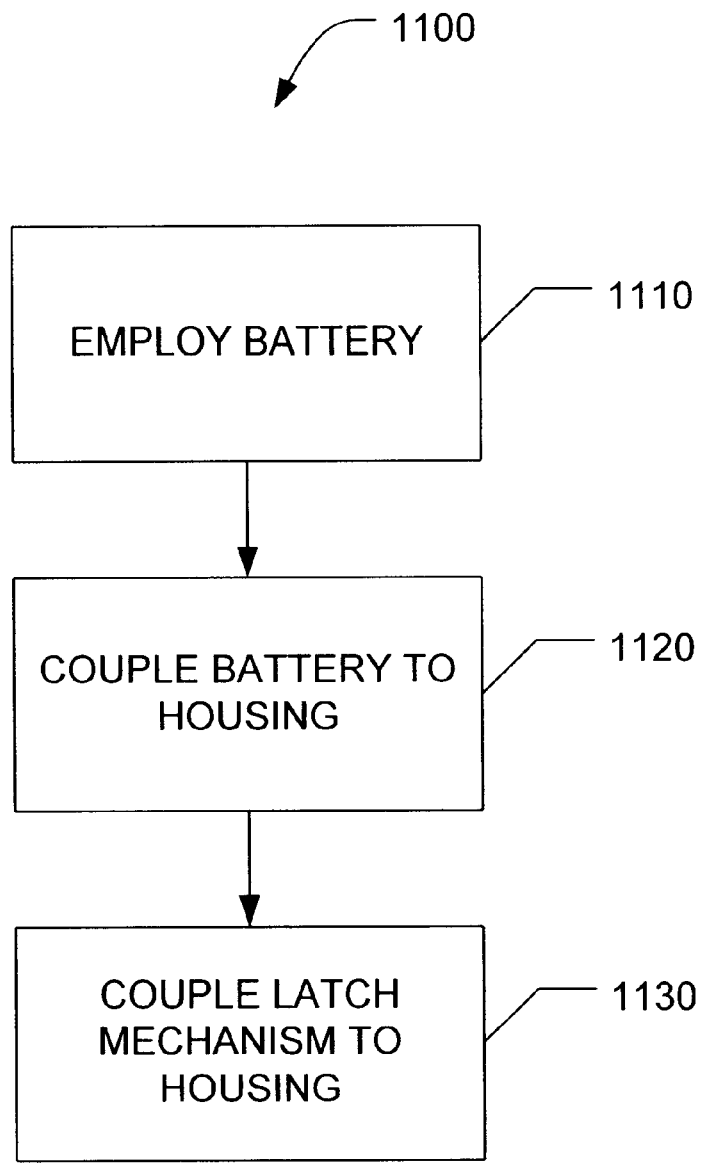
FIG. 11 illustrates a methodology for fabricating a secure battery latch in accordance with an aspect of the present invention.
Figure 12:
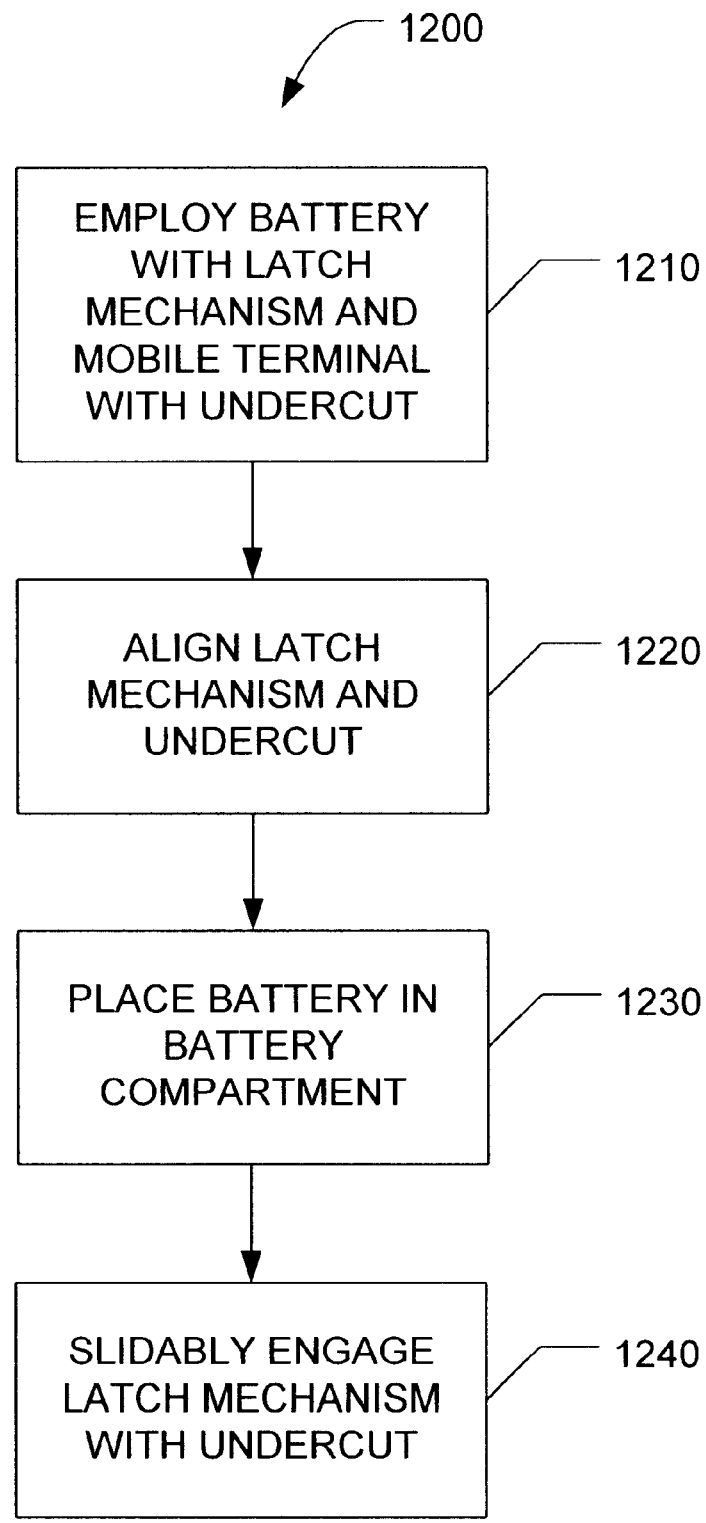
FIG. 12 illustrates a methodology for securing a battery within a battery compartment in accordance with an aspect of the present invention.

In view of the foregoing structural and functional features described above, methodologies in accordance with various aspects of the present invention will be better appreciated with reference to FIGS. 11–12. While, for purposes of simplicity of explanation, the methodologies of FIGS. 11–12 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 11 illustrates a methodology 1100 for fabricating a secure latch mechanism is accordance with an aspect of the present invention. The methodology begins at 1110 where a battery is employed. The battery may be of any type suitable for the application at hand. Then, at 1120 the battery is coupled to a housing. The battery housing includes a stepped surface on two opposing sides of the housing. At 1130, latch mechanisms are coupled to the stepped sides of the battery housing such that the latch mechanisms can slide along the housing.

FIG. 12 illustrates a methodology 1200 for securing a battery to a mobile terminal. This methodology begins at 1210 where a battery and mobile terminal are employed. Latches coupled to the battery are then aligned with latch receiving undercuts located within a battery compartment of the mobile terminal at 1220. Then, at 1230, the battery is placed in the battery compartment, such that electrical contacts of the battery are connected to electrical contacts in the battery compartment. At 1240, the latches are slidably engaged with the undercuts to facilitate a secure attachment of the battery to the mobile terminal.

It is to be appreciated that the batteries and methodologies of the subject invention as described herein have wide applicability. The batteries of the subject invention, having securing latches, can be employed for example in numerous types of commercial and industrial electronic devices (e.g., cellular telephones, computers, personal data assistants, cameras, toys, electronic games . . . ). Moreover, the methodologies of the subject invention can be employed in connection with processes associated with fabricating latch mechanisms related to such devices. It is also to be appreciated that the scope of the present invention is intended to include any portable electronic device and the type of battery it is employing.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A battery securing system, comprising:
a battery compartment having at least one latch receiving undercut therein;
a battery coupled to at least one latch that slidably engages with the at least one latch receiving undercut to facilitate securing the battery within the battery compartment, the at least one latch being slidably engaged with the at least one undercut after electrical contacts of the battery have connected to electrical contacts in the battery compartment; and,
a battery housing that slidably supports the at least one latch, the battery housing comprising at least one stepped surface upon which the at least one latch is coupled to, the stepped surface facilitating a sliding motion of the at least one latch along the surface.

2. The battery securing system of claim 1, the at least one latch including a support portion to support the at least one latch upon the stepped surface of the battery housing.

3. The battery securing system of claim 1, the at least one latch being L-shaped.

4. The battery securing system of claim 1, the battery having four latches coupled thereto and the battery compartment having four latch receiving undercuts.

5. The battery securing system of claim 1, the at least one latch slidably engaging the at least one undercut such that the battery remains stationary.

6. The battery securing system of claim 1, the electrical contacts of the battery being welded to a battery well.

7. The battery securing system of claim 1, employed in a mobile terminal.

8. The battery securing system of claim 1, employed in a computing device.

9. The battery securing system of claim 1, employed in a camera.

* * * * *